(12) United States Patent
Suciu et al.

(10) Patent No.: US 8,118,251 B2
(45) Date of Patent: Feb. 21, 2012

(54) MOUNTING SYSTEM FOR A GAS TURBINE ENGINE

(75) Inventors: Gabriel L. Suciu, Glastonbury, CT (US); Brian D. Merry, Andover, CT (US); Jon A. Marx, Machester, CT (US); Christopher M. Dye, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1070 days.

(21) Appl. No.: 12/016,337

(22) Filed: Jan. 18, 2008

(65) Prior Publication Data

US 2009/0183512 A1 Jul. 23, 2009

(51) Int. Cl.
*B64D 27/00* (2006.01)
*F02C 7/20* (2006.01)

(52) U.S. Cl. .............................. 244/54; 248/554; 60/797

(58) Field of Classification Search .................... 244/54, 244/55; 60/796, 797; 248/554, 555, 556, 248/557
See application file for complete search history.

(56) References Cited

U.S. PATENT DOCUMENTS

| | | | | |
|---|---|---|---|---|
| 3,222,017 A | * | 12/1965 | Bobo | 248/557 |
| 3,327,971 A | * | 6/1967 | Stewart et al. | 244/54 |
| 4,266,741 A | * | 5/1981 | Murphy | 244/54 |
| 4,966,338 A | | 10/1990 | Gordon | |
| 5,136,839 A | | 8/1992 | Armstrong | |
| 5,174,525 A | | 12/1992 | Schilling | |
| 5,273,393 A | | 12/1993 | Jones et al. | |
| 5,275,357 A | | 1/1994 | Seelen et al. | |
| 5,277,382 A | | 1/1994 | Seelen et al. | |
| 5,320,307 A | * | 6/1994 | Spofford et al. | 244/54 |
| 5,372,338 A | | 12/1994 | Carlin et al. | |
| 5,409,184 A | | 4/1995 | Udall et al. | |
| 5,443,229 A | | 8/1995 | O'Brien et al. | |
| 5,452,575 A | * | 9/1995 | Freid | 60/797 |
| 5,474,258 A | * | 12/1995 | Taylor et al. | 244/54 |
| 5,497,961 A | | 3/1996 | Newton | |
| 5,746,391 A | | 5/1998 | Rodgers et al. | |
| 5,810,287 A | | 9/1998 | O'Boyle et al. | |
| 5,860,276 A | | 1/1999 | Newton | |
| 5,871,175 A | | 2/1999 | Demouzon et al. | |
| 5,871,176 A | | 2/1999 | Demouzon et al. | |
| 5,871,177 A | * | 2/1999 | Demouzon et al. | 244/54 |
| 5,921,500 A | | 7/1999 | Ellis et al. | |
| 5,927,644 A | | 7/1999 | Ellis et al. | |
| 6,126,110 A | * | 10/2000 | Seaquist et al. | 244/54 |
| 6,138,949 A | | 10/2000 | Manende et al. | |
| 6,189,830 B1 | | 2/2001 | Schnelz et al. | |
| 6,474,597 B1 | | 11/2002 | Cazenave | |
| 6,517,027 B1 | | 2/2003 | Abruzzese | |

(Continued)

OTHER PUBLICATIONS

U.S. Appl. No. 11/832,107 dated Aug. 1, 2007, entitled "Engine Mounting Configuration For a Turbofan Gas Turbine Engine".

*Primary Examiner* — Joshua Michener
*Assistant Examiner* — Steven Hawk
(74) *Attorney, Agent, or Firm* — Cartson, Gaskey & Olds PC

(57) ABSTRACT

A mounting system for a gas turbine engine includes a thrust ring and a linkage assembly. The linkage assembly is at least partially received by the thrust ring. The linkage assembly reacts at least a side load and a thrust load communicated from the thrust ring.

20 Claims, 6 Drawing Sheets

U.S. PATENT DOCUMENTS

| | | |
|---|---|---|
| 6,652,222 B1 | 11/2003 | Wojtyczka et al. |
| 6,708,925 B2 | 3/2004 | Udall |
| 6,843,449 B1 * | 1/2005 | Manteiga et al. ............... 244/54 |
| 6,899,518 B2 | 5/2005 | Lucas et al. |
| 6,935,591 B2 * | 8/2005 | Udall ............................. 244/54 |
| 6,976,655 B2 | 12/2005 | Thompson |
| 7,021,585 B2 * | 4/2006 | Loewenstein et al. .......... 244/54 |
| 7,055,330 B2 | 6/2006 | Miller |
| 7,134,286 B2 | 11/2006 | Markarian et al. |
| 2004/0216461 A1 * | 11/2004 | Wallace et al. ................. 60/797 |
| 2006/0090448 A1 | 5/2006 | Henry |
| 2006/0248900 A1 | 11/2006 | Suciu et al. |

* cited by examiner

MOUNTING SYSTEM FOR A GAS TURBINE ENGINE

BACKGROUND OF THE INVENTION

This disclosure generally relates to a gas turbine engine, and more particularly to a mounting system for mounting a gas turbine engine to an aircraft pylon.

A gas turbine engine may be mounted at various points of an aircraft, such as a pylon integrated with an aircraft structure. For example, a mounting system is often used to support a gas turbine engine relative to the pylon. Mounting systems may include any combination of links, ball joints or plates that support the engine vertically, laterally and axially. The mounting system ensures the transmission of a variety of static and dynamic loads between the engine and the aircraft structure. The loads experienced by a mounting system include vertical loads and side loads (loads experienced perpendicular to an engine centerline axis), torque loads (loads experienced as a result of rotation of the engine) and thrust loads (loads experienced in a direction parallel to aircraft travel). The mounting system must also absorb the deformations that the engine is subjected to during different flight conditions and the dimensional variations caused by thermal expansion and retraction of the engine.

One known mounting system for a gas turbine engine includes a pylon having a forward mount and an aft mount. The forward mount dissipates thrust loads, vertical loads and side loads experienced adjacent to the front end of the engine. The aft mount dissipates vertical loads, side loads, thrust loads and torque loads experienced adjacent to the rear end of the engine.

One disadvantage of mounting systems of this type is the inability to adequately react (i.e., absorb and dissipate) the static (weight) loads and dynamic (maneuvering) loads created during operation of the engine as an engine distorts and flexes. The engine loads may distort the casing that surrounds the various engine components. This distortion can cause the clearances between the static cases and a plurality of rotating blade tips encased within the static cases to increase. This may negatively affect engine performance and increase fuel burn.

Accordingly, it is desirable to provide a mounting system for a gas turbine engine that minimizes tip clearances and that adequately dissipates the transmission of loads between the engine and the aircraft structure.

SUMMARY OF THE INVENTION

A mounting system for a gas turbine engine includes a thrust ring and a linkage assembly. The linkage assembly is at least partially received by the thrust ring. The linkage assembly reacts at least a side load and a thrust load communicated from the thrust ring.

A gas turbine engine includes a compressor section, a combustor section, a turbine section, a pylon and a mounting system. The mounting system includes a front mount and a rear mount that each extend from the pylon. The rear mount includes a thrust ring and a thrust tripod that is at least partially received by the thrust ring.

A method of mounting a gas turbine engine includes positioning a thrust ring about a turbine section, receiving at least a portion of a linkage assembly within the thrust ring, and reacting at least a side load and a thrust load of the gas turbine engine from the thrust ring to the linkage assembly.

The various features and advantages of this disclosure will become apparent to those skilled in the art from the following detailed description. The drawings that accompany the detailed description can be briefly described as follows.

DETAILED DESCRIPTION OF THE DISCLOSED EMBODIMENT

Figure 1:
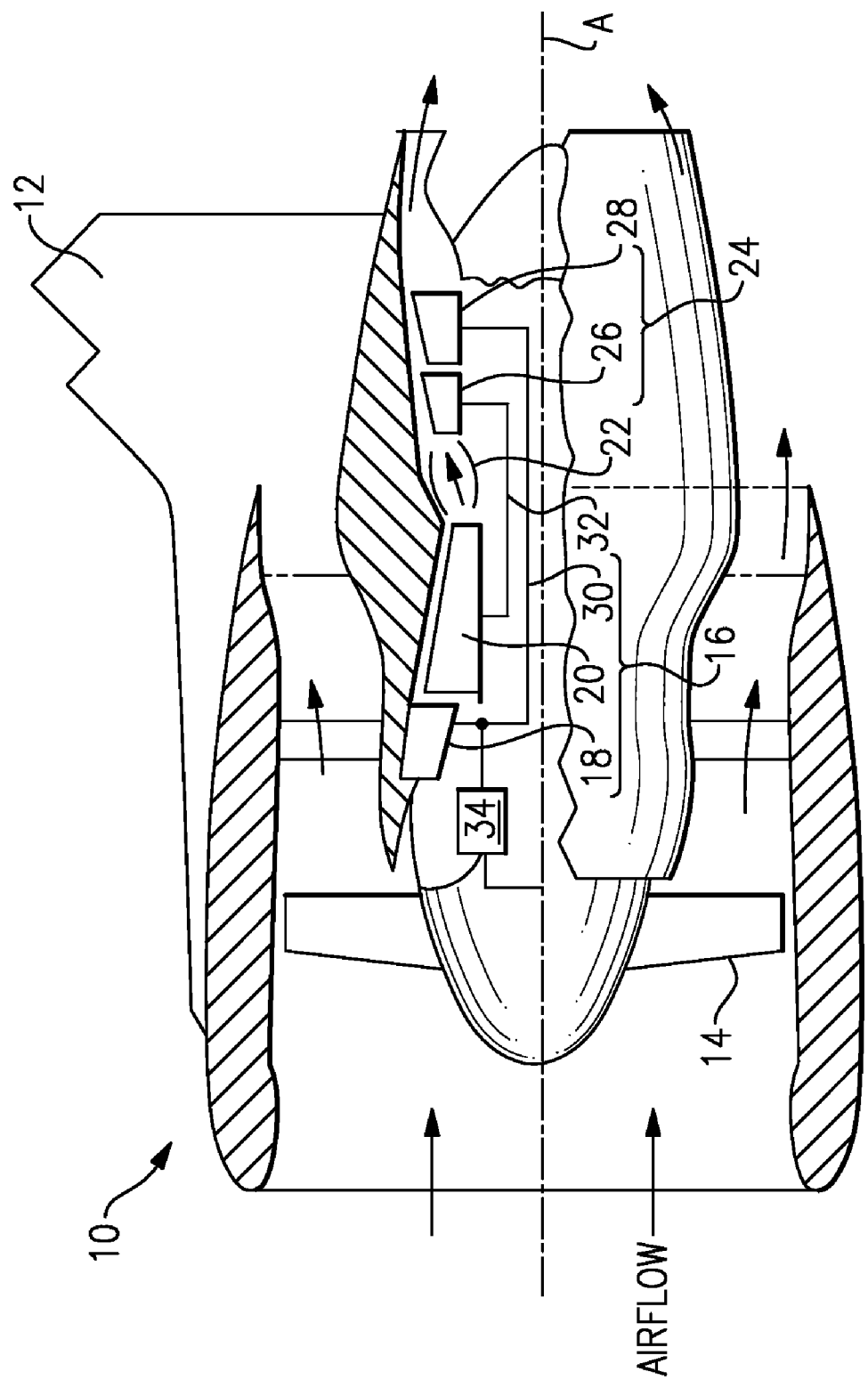
FIG. 1 illustrates a general sectional view of a gas turbine engine.

FIG. 1 illustrates a gas turbine engine 10 suspended from an engine pylon 12 as is typical of an aircraft designed for subsonic operation. In one example, the gas turbine engine 10 is a turbofan gas turbine engine. The gas turbine engine 10 includes a fan section 14, a compressor section 16 having a low pressure compressor 18 and a high pressure compressor 20, a combustor section 22, and a turbine section 24 having a high pressure turbine 26 and a low pressure turbine 28. A low speed shaft 30 rotationally supports the low pressure compressor 18 and the low pressure turbine 28. The low speed shaft 30 also drives the fan section 14 either directly or through a gear train 34, for example. A high speed shaft 32 rotationally supports the high pressure compressor 20 and the high pressure turbine 26. The low speed shaft 30 and the high speed shaft 32 rotate about a longitudinal centerline axis A of the gas turbine engine 10.

During operation, airflow is drawn into the gas turbine engine 10 by the fan section 14 and is pressurized in the compressor section 16. Fuel is mixed with the pressurized air and combusted within the combustor section 22. The combustion gases are discharged through the turbine section 24, which extracts energy therefrom for powering the compressor section 16 and the fan section 14. Of course, this view is highly schematic. It should be understood that the features and example illustrations presented herein are not limited to a turbofan gas turbine engine. That is, the present disclosure is applicable to any engine architecture including a geared fan turbofan.

Figure 2:
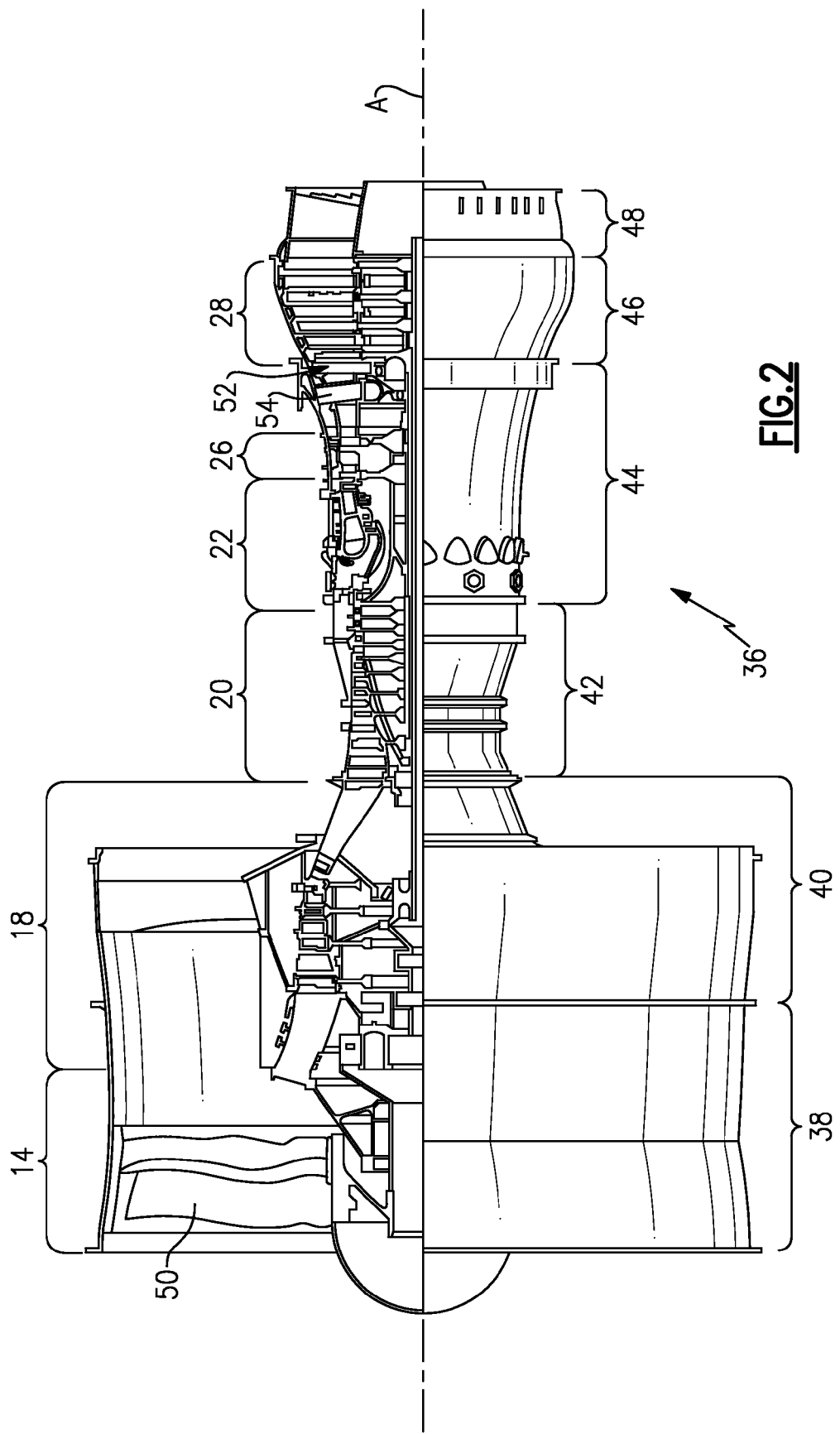
FIG. 2 illustrates a partial sectional view of an example gas turbine engine having an engine static case structure on the lower half thereof.

FIG. 2 illustrates an engine static case structure 36 of the example gas turbine engine 10. The engine static case structure 36 generally includes a fan case 38, an intermediate case (IMC) 40, a high pressure compressor case 42, a diffuser case 44, a low pressure turbine case 46 and a turbine exhaust case 48. The fan section 14 includes a plurality of circumferentially spaced fan blades 50 that are surrounded by the fan case 38.

In one example, the turbine section 24 includes a mid-turbine frame (MTF) 52 that includes a plurality of radially extending structural struts 54 that are preloaded in tension.

The MTF 52 provides aft structural support within the diffuser case 44 and rotatably supports the low speed shaft 30 and the high speed shaft 32.

Figure 3:
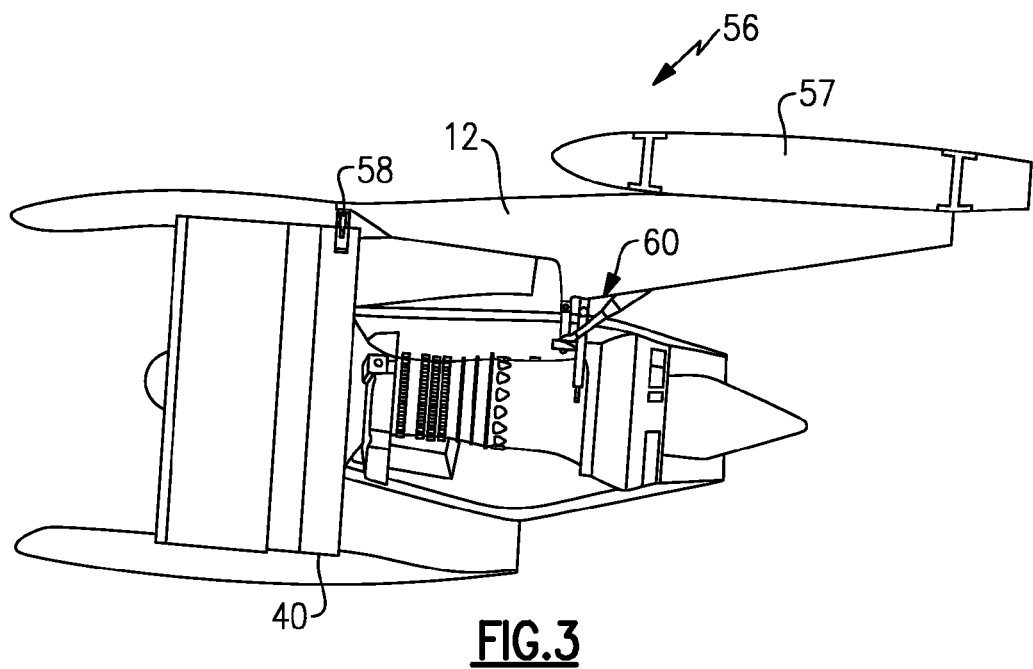
FIG. 3 illustrates an example mounting system for a gas turbine engine having a front mount at a first location.
Figure 4:
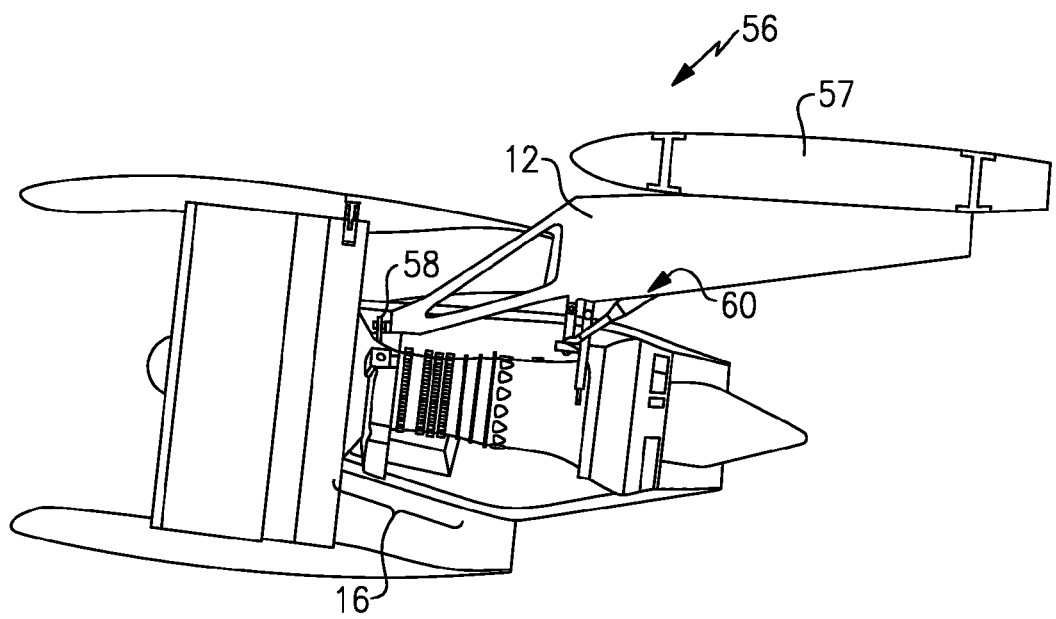
FIG. 4 illustrates the example mounting system of FIG. 3 having a front mount at a second location.

FIG. 3 illustrates an example mounting system 56 for mounting the gas turbine engine 10 to an aircraft structure, such as an aircraft wing 57, that includes the pylon 12. The mounting system 56 includes a front mount 58 and a rear mount 60. In this example, the front mount 58 is secured to the IMC 40. In another example, the front mount 58 is secured to the core engine, such as a portion of the compressor section 16, for example (See FIG. 4). A person of ordinary skill in the art having the benefit of this disclosure would be able to select an appropriate mounting location for the front mount 58.

The front mount 58 distributes and dissipates engine loads about the gas turbine engine 10. For example, the front mount 58 reacts both vertical loads and side loads experienced by the gas turbine engine 10. Vertical loads are loads created by the weight of the gas turbine engine 10. Side loads are engine loads that are created through crosswinds or maneuvering of the gas turbine engine 10. Both the vertical loads and the side loads are perpendicular to the longitudinal centerline axis A of the gas turbine engine 10.

The term "reacts" as utilized in this disclosure is defined as absorbing a load and dissipating the load to another location of the gas turbine engine 10. For example, the front mount 58 reacts the vertical loads and side loads from a front end of the gas turbine engine 10 to the pylon 12. In one example, the front mount 58 is a shackle arrangement and includes a generally plate-like member that is fastened to connect the front mount 58 to the pylon 12 and a portion of the gas turbine engine 10.

Figure 5A:
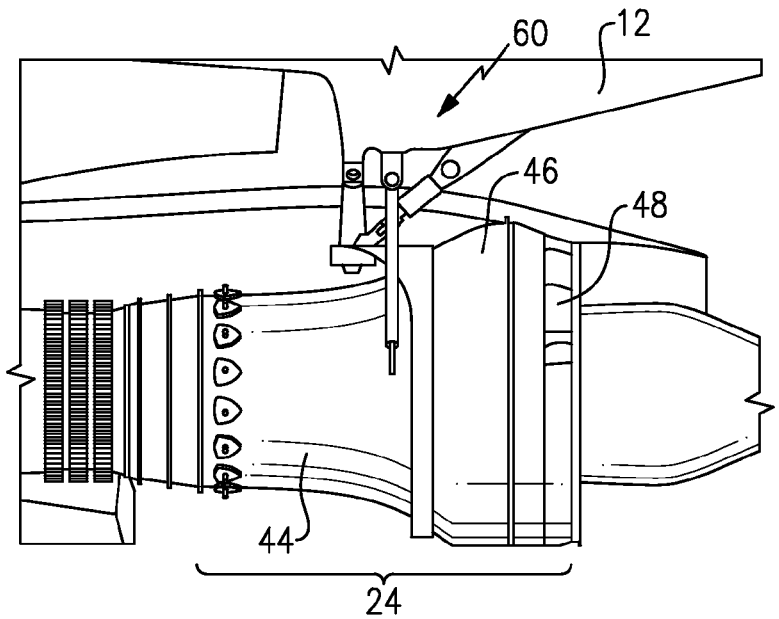
FIG. 5A illustrates a side view of a rear mount of the example mounting system illustrated in FIGS. 3 and 4.
Figure 5B:
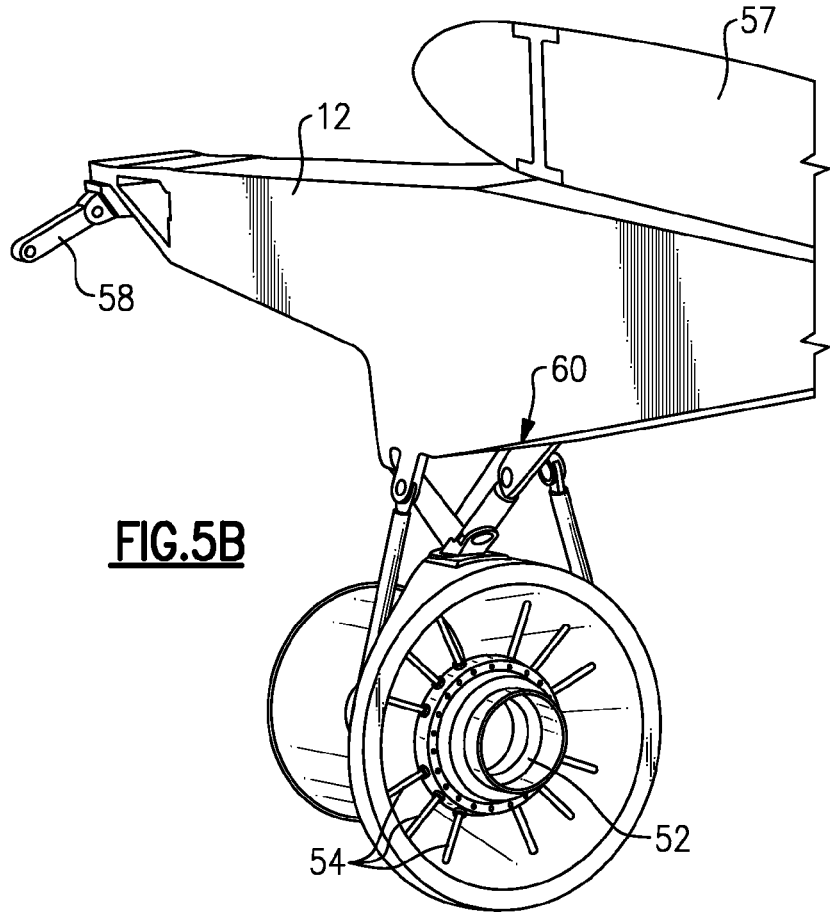
FIG. 5B illustrates an isometric view of the example rear mount illustrated in FIG. 5A.

FIGS. 5A and 5B illustrate an example rear mount 60 of the mounting system 56. In one example, the rear mount 60 is secured to the diffuser case 44 of the gas turbine engine 10. In another example, the rear mount 60 is secured adjacent to the MTF 52 of the turbine section 24 (see FIG. 5B). In yet another example, the rear mount 60 is secured to the gas turbine engine 10 adjacent to the turbine exhaust case 48. It should be understood that the rear mount 60 may alternatively be mounted at any other region of the gas turbine engine 10.

Figure 6:
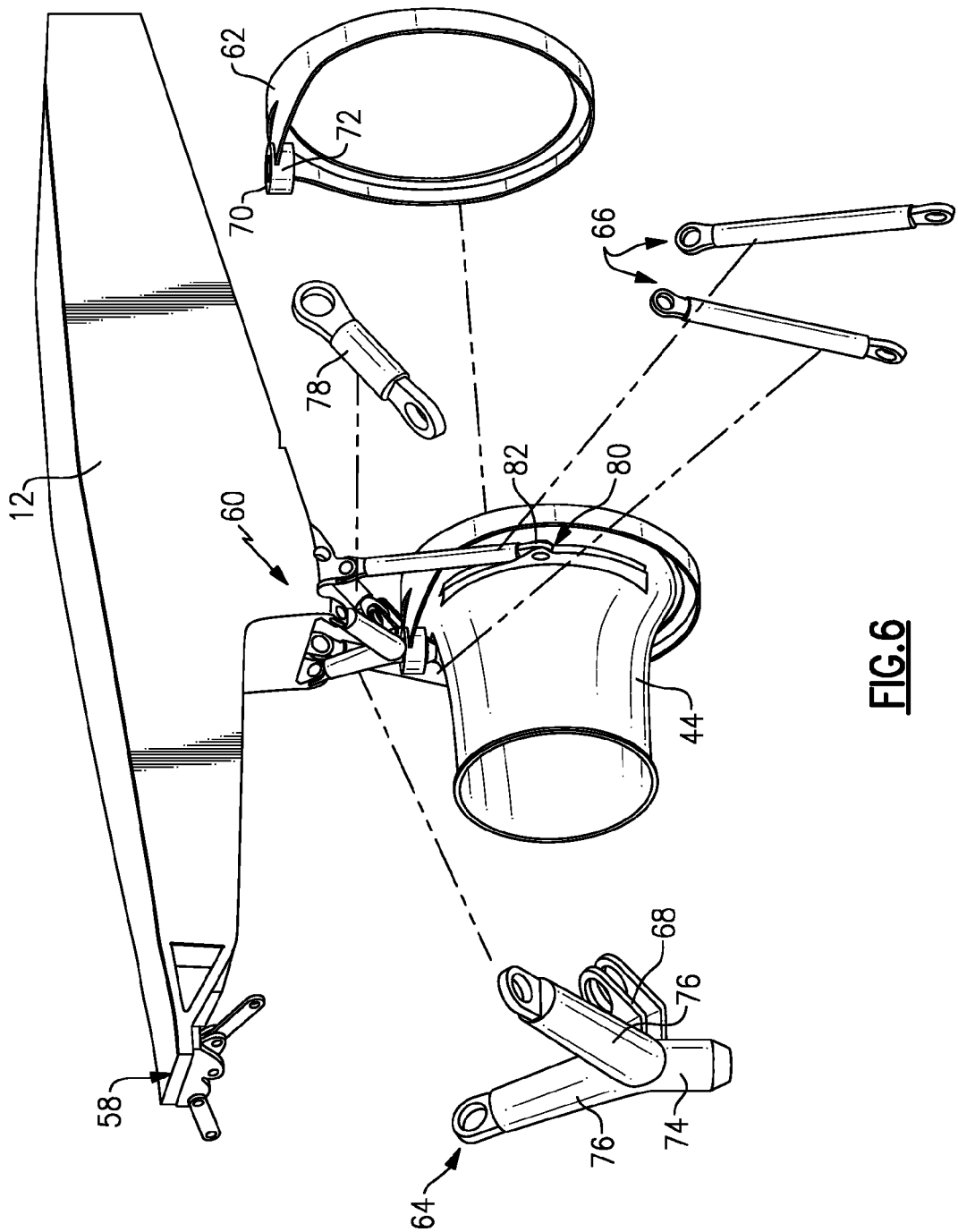
FIG. 6 illustrates an exploded view of an example mounting system including a rear mount having a linkage assembly and a thrust ring.

Referring to FIG. 6, the rear mount 60 includes a thrust ring 62, a linkage assembly 64, and linkage arms 66. In one example, the thrust ring 62 is positioned between the diffuser case 44 and the low pressure turbine case 46. In another example, the thrust ring 62 extends circumferentially about the turbine section 24 over a range of 360°. That is, the thrust ring 62 entirely surrounds a portion of the gas turbine engine 10 and is shaped to distribute the thrust loads that act upon the engine 10 from a widespread area of the engine to a single point, as is further discussed below. Although the example thrust ring 62 is illustrated as a separate component, it should be understood that the thrust ring 62 may be formed integrally with a portion of the engine static case structure 36 or other engine mounting equipment, for example.

The thrust ring 62 includes a cup 70 having a ball mount 72. In the illustrated example, the ball mount 72 transversely protrudes from the thrust ring 62 in an upstream direction. The cup 70 and the ball mount 72 of the thrust ring 62 receive a lower portion of the linkage assembly 64, as is further discussed below.

The linkage assembly 64 is a thrust tripod that is generally Y-shaped, in one example. The linkage assembly 64 includes a pin 74, a pair of opposing side load arms 76 and a thrust joint 68. Although the example linkage assembly 64 is illustrated as having a tripod configuration, it should be understood that the linkage assembly 64 could be configured with any number and design of linkages that interact with the thrust ring 62 to react loads.

In one example, the pin 74 is positioned vertically relative to the gas turbine engine 10 (where the rear mount 60 is assembled) (See FIGS. 5A and 5B). The pin 74 is received within the ball mount 72 of the cup 70 of the thrust ring 62. The thrust ring 62 communicates thrust loads directly to the pin 74. In this example, the pin 74 is slideably received within the ball mount 72 to allow for thermal growth of the gas turbine engine 10 and to dissipate the engine loads that are concentrated at the pin 74 to the other components of the rear mount 60. That is, because the pin 74 is free to move within the cup 70, the engine loads experienced at the pin 74 may be communicated to other portions of the rear mount 60 thereby reducing the amount of stress localized at the pin 74.

The side load arms 76 transversely protrude from the pin 74. In one example, the side load arms 76 extend at opposite directions from the pin 74 at an equivalent angle. Each side load arm 76 is attached to the pylon 12, such as by bolting the side load arm 76 thereto, for example.

The thrust joint 68 protrudes from the pin 74 in an aftward direction relative to the gas turbine engine 10. In one example, the thrust joint 68 is angled relative to the pin 74. The actual angle of the thrust joint 68 relative to the pin 74 will vary depending upon design specific parameters including, but not limited to, the location of the pylon 12 rear mount 60 interface. A thrust link 78 is connected to the thrust joint 68 on one end, and is connected to the pylon 12 at an opposite end. The thrust link 78 is bolted to both the thrust joint 68 and the pylon 12, in one example.

The rear mount 60 also includes linkage arms 66 that extend between the turbine section 24 and the pylon 12. In one example, the linkage arms 66 extend from the diffuser case 44 to the pylon 12. In this example, the diffuser case 44 includes a flange 80 having fastening linkages 82 for bolting the linkage arms 66 thereto. The linkage arms 66 are fastened to the pylon 12 at an opposite end of the linkage arm 66 from the fastening linkages 82, such as by bolting, for example.

The linkage arms 66 retain the vertical positioning of the gas turbine engine 10 relative to the pylon 12. In one example, the linkage arms 66 are connected to the diffuser case 44 and the connections are spaced apart by approximately 180° on the diffuser case 44. A spacing of 180° minimizes ovalization distortion created by transmitting mount loads to the MTF 52. It should be understood that other mounting locations and spacing configurations for the linkage arms 66 are contemplated as within the scope of this disclosure.

Figure 7:
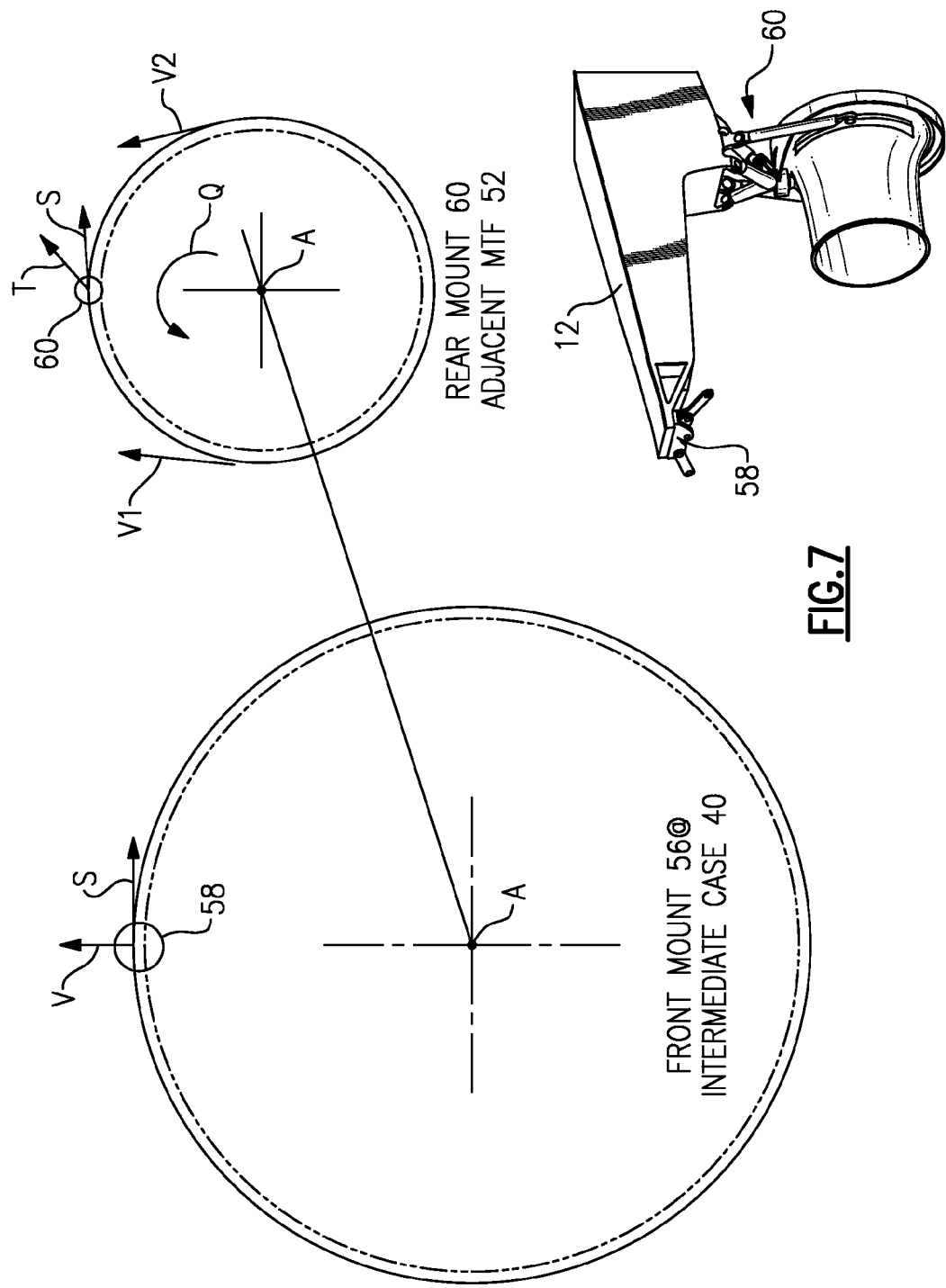
FIG. 7 illustrates a free body diagram illustrating loads reacted by the example mounting system of FIGS. 3-7.

FIG. 7, with continuing reference to FIGS. 1-6, is a free body diagram that schematically illustrates a variety of engine loads that are reacted by the example mounting system 56. In this example, the front mount 58 is operable to react both vertical loads V and side loads S that act adjacent to a forward end of the gas turbine engine 10. Vertical loads V are loads created by the weight of the gas turbine engine 10. Side loads S are engine loads that are created through crosswinds or maneuvering of the gas turbine engine 10. Both the vertical loads V and the side loads S act upon the engine 10 in directions that are perpendicular to the longitudinal centerline axis A of the gas turbine engine 10. The vertical loads V and the side loads S are absorbed by the front mount 58 and communicated from the core engine to the pylon 12. In one example, the front mount 58 is not required to react thrust loads of the gas turbine engine 10.

In this example, the rear mount 60 reacts thrust loads T, side loads S, vertical loads V and torque loads Q. Thrust loads T are loads experienced by the gas turbine engine 10 that occur parallel to the engine longitudinal centerline axis A and occur during propulsion of the aircraft. Torque loads Q are loads that result from rotation of the internal components of the gas turbine engine 10 (and the side loads S and thrust loads T).

The thrust ring 62 supports a thrust load T and a side load S. The thrust ring 62 communicates the thrust load T and the side loads S to the pin 74. The pin 74 also supports thrust loads T and side loads S. The side loads S that are reacted by the pin 74 are communicated to the side load arms 76 and subsequently dissipated into the pylon 12. The thrust load T experienced at the pin 74 is communicated from the linkage assembly 64, through the thrust link 68, and subsequently to the pylon 12.

The linkage arms 66 support vertical loads V1 and V2, respectively, and the torque load Q. The linkage arms 66 also maintain the vertical positioning of the gas turbine engine 10 relative to the pylon 12. The vertical loads V1, V2 and the torque load Q are communicated from each linkage arm 66 directly to the pylon 12 to dissipate the loads.

The foregoing description shall be interpreted as illustrative and not in any limiting sense. A worker of ordinary skill in the art having the benefit of this disclosure would recognize that certain modifications would come within the scope of the disclosure. For these reasons, the following claims should be studied to determine the true scope and content of this disclosure.

What is claimed is:

1. A mounting system for a gas turbine engine, comprising:
a thrust ring; and
a linkage assembly embodying a monolithic structure that is at least partially received by said thrust ring, wherein said linkage assembly reacts at least a side load and a thrust load communicated from said thrust ring; and
wherein said linkage assembly is a thrust tripod that includes a pin, at least two side-load arms, and a thrust joint.

2. The system as recited in claim 1, wherein said thrust ring includes a cup having a ball mount, and the pin of said linkage assembly is slideably received within said cup.

3. The system as recited in claim 1, wherein said at least two side-load arms transversely extend from said pin, and said thrust tripod is generally Y-shaped.

4. The system as recited in claim 1, wherein said thrust joint extends in an aft direction from said pin relative to the gas turbine engine.

5. The system as recited in claim 4, wherein said thrust joint is angled relative to said pin, and including a thrust link attached to said thrust joint.

6. The system as recited in claim 1, comprising at least one linkage arm that vertically supports the gas turbine engine.

7. A gas turbine engine, comprising:
a compressor section, a combustor section, and a turbine section;
a pylon;
a mounting system including a front mount and a rear mount each extending from said pylon, wherein said rear mount includes a thrust ring and a thrust tripod at least partially received by said thrust ring; and
wherein said thrust tripod includes a pin, at least two side-load arms, and a thrust joint.

8. The gas turbine engine as recited in claim 7, wherein said thrust tripod embodies a monolithic structure.

9. The gas turbine engine as recited in claim 7, wherein said rear mount is attached to said gas turbine engine adjacent a mid turbine frame.

10. The gas turbine engine as recited in claim 7, wherein said rear mount is attached to said gas turbine engine adjacent a diffuser case.

11. The gas turbine engine as recited in claim 7, wherein said front mount is attached to a fan section of said gas turbine engine.

12. The gas turbine engine as recited in claim 7, wherein said front mount is attached to said compressor section of said gas turbine engine.

13. The gas turbine engine as recited in claim 7, wherein said thrust ring extends circumferentially about a portion of said turbine section over a range of 360 degrees.

14. The gas turbine engine as recited in claim 7, wherein said thrust ring is positioned between a diffuser case and a low pressure turbine case of said turbine section.

15. The gas turbine engine as recited in claim 7, wherein said thrust tripod reacts at least a side load and a thrust load communicated from said thrust ring.

16. The gas turbine engine as recited in claim 7, wherein said rear mount includes at least two linkage arms connected between said turbine section and said pylon to vertically support said gas turbine engine and to react torque loads of said gas turbine engine.

17. A method of mounting a gas turbine engine having a compressor section, a combustor section, a turbine section, and a rear mount including a thrust ring and a linkage assembly, comprising the steps of:
a) positioning the thrust ring about the turbine section;
b) receiving a least a portion of the linkage assembly within the thrust ring wherein the linkage assembly comprises a thrust tripod embodying a monolithic structure; and
c) reacting at least a side load and a thrust load of the gas turbine engine from the thrust ring to the linkage assembly.

18. The method as recited in claim 17, wherein the turbine section includes a diffuser case and a low pressure turbine case, and said step a) includes the step of:
positioning the thrust ring between the diffuser case and the low pressure turbine case.

19. The method as recited in claim 17, comprising the step of:
d) communicating at least the side load and the thrust load from the linkage assembly to a pylon of the gas turbine engine.

20. A mounting system for a gas turbine engine, comprising:
a pylon;
an engine static case structure that houses the gas turbine engine; and
a mounting system that mounts said engine static case structure to said pylon, wherein said mounting system includes a front mount and a rear mount positioned downstream from said front mount, and said rear mount includes:
a thrust ring that circumferentially surrounds a portion of said engine static case structure, wherein said thrust ring includes a cup having a ball mount that transversely protrudes from said thrust ring in a direction toward said front mount;
a linkage assembly having a pin and a pair of opposing side arms that vertically and transversely extend from said pin, wherein said pin is slidably received within said ball mount; and
linkage arms that are connected at one end to said engine static case structure and are connected at an opposite end to said pylon.

* * * * *